United States Patent
Israelsson (10) Patent No.: US 6,301,483 B1
(45) Date of Patent: Oct. 9, 2001

(54) DEVICE NETWORK AND METHODS CONCERNING CORDLESS TELECOMMUNICATION

(75) Inventor: Martin Israelsson, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/188,389

(22) Filed: Nov. 10, 1998

(30) Foreign Application Priority Data

Nov. 11, 1997 (SE) .................................................. 9704127

(51) Int. Cl.$^7$ ...................................................... H04Q 7/20
(52) U.S. Cl. ........................ 455/462; 455/434; 455/437; 455/552
(58) Field of Search .................................. 455/445, 432, 455/433, 435, 67.1, 425, 405, 465, 462, 437, 434, 406–408, 414, 422, 443, 444, 438, 436, 439–440, 552, 553, 515, 550, 166.2; 379/220, 207, 230, 219, 221

(56) References Cited

U.S. PATENT DOCUMENTS

| | | | | |
|---|---|---|---|---|
| 5,590,172 | * | 12/1996 | Lodwig et al. ........................ | 379/58 |
| 5,600,705 | * | 2/1997 | Maenpaa ................................ | 379/58 |
| 5,784,693 | * | 7/1998 | Barber et al. ......................... | 455/434 |
| 5,832,367 | * | 11/1998 | Bamburak et al. .................... | 455/62 |
| 5,839,069 | * | 11/1998 | Keshavachar et al. ............... | 455/437 |
| 5,903,832 | * | 5/1999 | Seppanen et al. .................... | 455/414 |
| 5,918,175 | * | 6/1999 | Tayloe et al. ......................... | 455/427 |
| 5,920,818 | * | 7/1999 | Frodigh et al. ....................... | 455/443 |
| 6,064,887 | * | 5/2000 | Kallioniemi et al. ................. | 455/445 |
| 6,085,110 | * | 7/2000 | Nilsson ................................. | 455/422 |

FOREIGN PATENT DOCUMENTS

| | | |
|---|---|---|
| 95/15664 | 6/1995 | (WO) . |
| 96/21329 | 7/1996 | (WO) . |
| 96/21330 | 7/1996 | (WO) . |
| 96/34502 | 10/1996 | (WO) . |
| 97/03529 | 1/1997 | (WO) . |
| 9728663 * | 8/1997 | (WO) .............................. H04Q/7/22 |

\* cited by examiner

*Primary Examiner*—Daniel Hunter
*Assistant Examiner*—Pablo Tran
(74) *Attorney, Agent, or Firm*—Burns, Doane, Swecker & Mathis, L.L.P.

(57) ABSTRACT

The present invention relates to a method of updating the home node of a cordless terminal as well as a private telecommunication network, a means for handling cordless terminals or mobility server and a server where such a method is realized. A geographical area within which a cordless terminal is able to uphold radio contact with a mobility server is defined as the geographical area of that mobility server and each cordless terminal has one mobility server as home node. The network, means for handling cordless terminals and server determine a measure of the time the cordless terminal has been located in a geographical area of a new mobility server other than an old mobility server to which the terminal belongs, (step 92) and sets the cordless terminal as belonging to the new mobility server, (step 100), if the measure exceeds a threshold, (step 96).

20 Claims, 8 Drawing Sheets

FIG. 1

| IDENTITY | NODE |
|----------|------|
| 10001    | 1    |
| 10002    | 1    |
| 10003    | 1    |
| ......   |      |
| 20001    | 2    |
| 20002    | 2    |
| 20003    | 2    |
| ......   |      |
| 30001    | 3    |
| 30002    | 3    |
| 30003    | 3    |

TABLE 46

FIG. 2A

| IDENTITY | VISITING NODE | SERVICE PROFILE | AUTHORISATION KEY |
|----------|---------------|-----------------|-------------------|
| 30001    | 3             | PROFILE1        | KEY30001          |
| 30002    | 2             | PROFILE2        | KEY30002          |
| 30003    | 1             | PROFILE1        | KEY30003          |

HDB 54

FIG. 2B

| IDENTITY | HOME NODE | CONNECTED TO RE NO | AUTHORISATION KEY |
|----------|-----------|--------------------|-------------------|
| 10001    | 1         | *                  | KEY10001          |
| 20002    | 2         | *                  | KEY20002          |
| 30003    | 3         | 18                 | KEY30003          |

VDB 36

HDB 34

| IDENTITY | VISITING NODE | SERVICE PROFILE | AUTHORISATION KEY |
|---|---|---|---|
| 10001 | 1 | PROFILE1 | KEY10001 |
| 10002 | 2 | PROFILE1 | KEY10002 |
| 10003 | 3 | PROFILE1 | KEY10003 |
| 30003 | 1 | PROFILE1 | KEY30003 |

DEVICE NETWORK AND METHODS CONCERNING CORDLESS TELECOMMUNICATION

TECHNICAL FIELD

The present invention relates to the area of private telecommunication networks comprising means for handling cordless terminals, such as mobility servers handling the connections set up to and from cordless terminals in cordless telephone networks. These devices also handle the services that cordless terminals are allowed to use in private cordless networks. More particularly the present invention relates to the automatic updating of to which means for handling cordless terminals a cordless terminal belongs.

DESCRIPTION OF RELATED ART

In the world of private networks comprising private branch exchanges, where each private branch exchange also comprises cordless terminals in combination with ordinary terminals in the form of ordinary telephone sets, it is customary to provide a home data base in each exchange for handling of cordless terminals belonging to the exchange as well as a visitor data base for registering cordless terminals visiting the exchange but belonging to another exchange.

There also exist mobility servers arranged for handling the functions available to cordless terminals. In WO96/21330 and WO96/21329 mobility servers according to the state of the art are described. The mobility servers according to these documents are in the form of extensions or adjunct nodes to private branch exchanges and handle communications with cordless terminals connected to these private branch exchanges via radio exchanges. These mobility servers comprise means for handling functionality for cordless terminals belonging to the servers but also means for handling functionality for terminals visiting a mobility server.

When assigning a cordless terminal to a private branch exchange or a mobility server, the terminal gets assigned a number within a number series dedicated to that exchange or mobility server. If such a terminal temporarily moves to another area served by another mobility server or exchange within the same private network, that other mobility server immediately knows where the home of the terminal is through just seeing that the number or identity of the terminal is within the number series of the first mobility server or exchange. In this way the other mobility server or exchange knows what mobility server or exchange to contact in order to obtain such things as service profile or authorization keys etc. The problem with the system as outlined above is that once a terminal has received a number it is difficult to make any changes of home data base. If the user of a terminal belonging to one area covered by a mobility server or an exchange moves to an area covered by another mobility server or exchange a lot of unnecessary information will be transmitted between these two mobility servers or exchanges in order to receive such things as service profiles and authorization keys for setting up connections. This is an inefficient use of the network. In order to change home data base for obviating above mentioned problems one has to fetch the terminal and program another number into it, which other number then is within the number series of the new mobility server or exchange. Needless to say this is also cumbersome and inefficient. Another disadvantage is that it is not possible to let one home data base register more terminals than the number series includes, which unduly limits the system.

WO95/15664 describes a system of the type radio in the local loop. When, in this system, a subscriber unit is registered in its home access network, its home access number is transmitted to the subscriber unit for storage there. When the unit moves to a visited access network and registers there, the subscriber unit transmits the home access number to the visited access network for contact with the home access network.

The document WO96/34502 describes the setting up of a call from a fixed network to a cordless network. The cordless network includes a home location register.

WO97/03529 describes a system where an area of where to page a pager is automatically updated by tracking the mobility pattern of the pager. What is updated is a list of in which cells where to first page the pager. This list contains all the cells where the pager has been most frequently encountered. A pager is then paged in the cells of the list in descending order. When a pager has been for a while in a cell not on the list, that cell is put on the list after the updating, if the pager has been paged in that cell more frequently than in at least one cell on the list.

None of the documents cited are related to the above outlined problems associated with fixed numbers.

There therefore exists a need for an easier way to change the mobility server or means for handling cordless terminals to which a cordless terminal belongs, when the user of the terminal has moved to the area of another mobility server on a permanent basis.

SUMMARY

The present invention thus attacks the problem of how to update to which means for handling cordless terminals a certain terminal belongs, when the user of that terminal has moved on a more or less permanent basis from an area covered by an old means for handling cordless terminals to an area covered by a new means for handling cordless terminals.

This problem is solved by determining a measure of the time a cordless terminal has been located in a geographical area of the new means for handling cordless terminals and setting the cordless terminal as belonging to the new means for handling cordless terminals if the measure exceeds a certain threshold.

One object of the present invention is thus to obtain a private telecommunication network, a means for handling cordless terminals in such a private telecommunication network, a server for connection in such a private telecommunication network as well as methods for updating to which means for handling cordless terminals such a cordless terminal belongs.

This object is achieved by a private telecommunication network, a means for handling cordless terminals and a server in such a network comprising means for determining a measure of the time a cordless terminal has been located in a geographical area of a new means for handling cordless terminals and means for setting the cordless terminal as belonging to the new means for handling cordless terminals if the measure exceeds a threshold.

This object is also achieved by a method of updating to which means for handling cordless terminals such a terminal belongs, where the method comprises the steps of determining a measure of the time the cordless terminal has been located in a geographical area of a new means for handling terminals and setting the cordless terminal as belonging to the new means for handling cordless terminals if the measure exceeds a threshold.

Another object of the present invention is to obtain a method of registering cordless terminals in a private telecommunication network, which method facilitates easier updating of the means for handling cordless terminals to which a terminal belongs.

This object is achieved by a method comprising the steps of registering, in a first register means, which means for handling cordless terminals said cordless terminal belongs to, and registering, in a second register means provided in or for the means for handling cordless terminals indicated in the first register means, the cordless terminal as belonging to said means for handling cordless terminals.

One advantage of the invention is that the network itself analyses the most suitable node to which a cordless terminal belongs and automatically registers the terminal there. No manual registration is necessary Another advantage of the invention is that numbers or identities for cordless terminals can be associated with a home node without having to take regard to a limited number series. The identity is thus no limitation for assigning a home node.

Another advantage of the invention is that a change of home node can be performed while the cordless terminal is being used.

The expression determining a measure of the time a cordless terminal is located in a geographical area is intended to encompass direct measurement of such time as well as any suitable way of determining when to change home node, such as indirect measurement like incrementing a counter every time a cordless terminal is used in an area.

The expression means for handling cordless terminals is intended to encompass such devices such as exchanges, like private branch exchanges that include functions for handling cordless terminals as well as mobility servers, either connected to a private branch exchange or itself comprising switching ability.

The invention will now be described with the aid of preferred embodiments thereof and with reference made to the enclosed drawings.

DETAILED DESCRIPTION OF EMBODIMENTS

Figure 1:
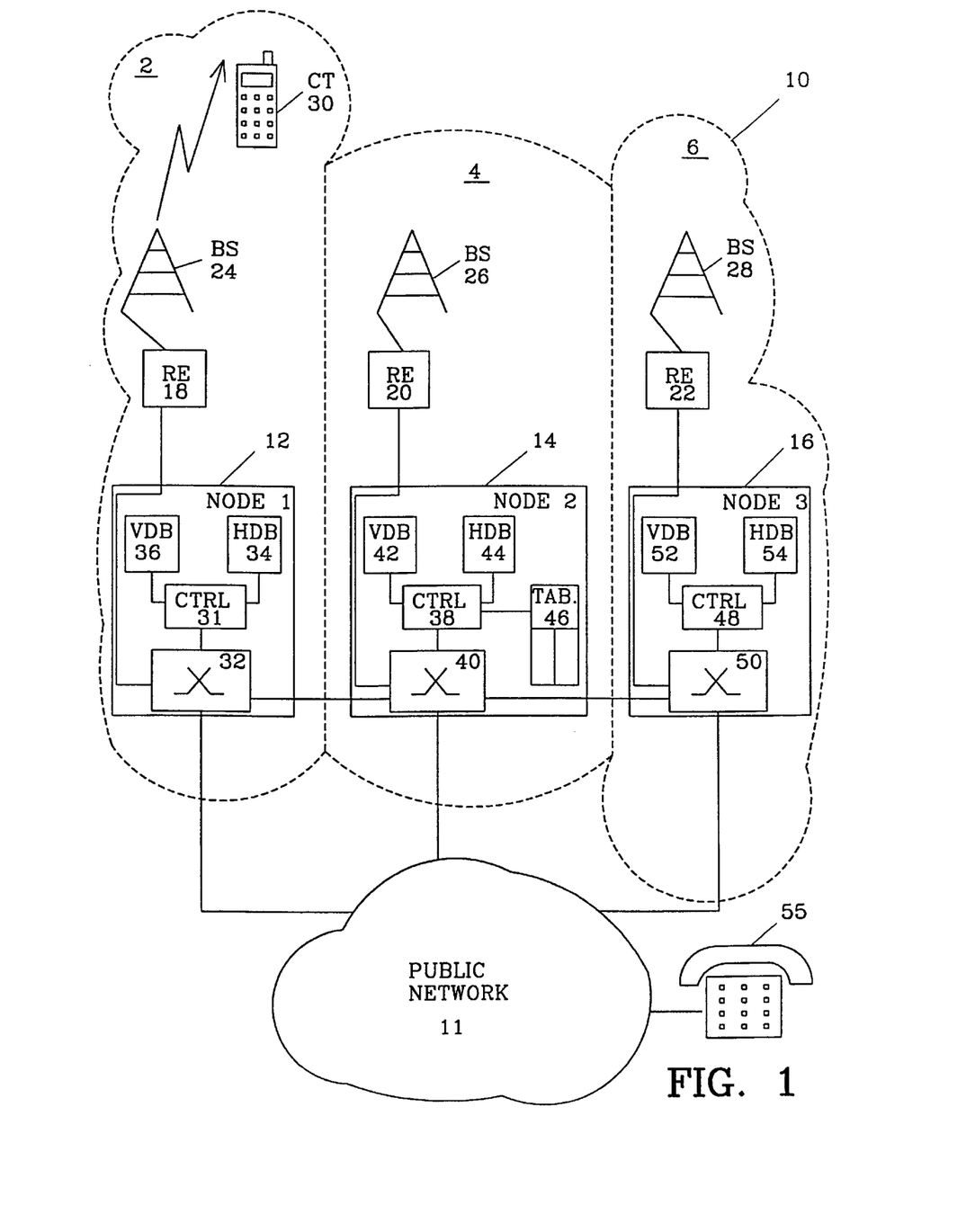
FIG. 1 shows a block schematic of a network according to a first embodiment of the invention.

FIG. 1 shows a private cordless network 10 according to the invention which is connected to a public fixed network 11 such as PSTN (Public Switched Telephone Network) or ISDN (Integrated Services Digital Network). By this it its intended to show that the preferred version of the present invention is a cordless network without any fixed terminals or private branch exchanges. The cordless network according to the invention could also be connected to a private network such as a network consisting of one or more private branch exchanges, etc. or to both a private network and a public network. The private network 10 could of course also include one or more private branch exchanges for handling fixed terminals, but the preferred version is this pure private cordless network. A fixed subscriber terminal 55 is connected to the public network 11.

FIG. 1 shows more particularly a private cordless network 10 including three different means for handling cordless terminals or mobility servers 12, 14 and 16, where each has switching capability and they are therefore also denoted node 1, node 2 and node 3, respectively. A first mobility server 12, node 1, is connected to a first radio exchange RE 18. A first base station BS 24 is connected to this first radio exchange RE 18. One cordless terminal CT 30 of the DECT (Digital Enhanced Cordless telecommunications) type is connected to the first base station BS 24 via a radio or aerial interface, indicated by a flashlike arrow. The second mobility server 14 is connected to a second radio exchange RE 20 and a second base station BS 26 is shown connected to the second RE 20. The third mobility server 16 is connected to a third base station BS 28 via a third radio exchange RE 22. All mobility servers are connected to the public network 11 and the first mobility server 12 is connected to the second mobility server 14 and the second mobility server 14 is connected to the third mobility server 16. All base stations connected to node 1 cover a first geographical area of the network 2, which area is defined as the area within which a cordless terminal is able to uphold radio contact with node 1 via a RE. Node 2 and node 3 have similarly a second geographical area 4 and a third geographical area 6, respectively. The areas are here shown as lying adjacent to each other. That can sometimes be the case, but they can also make up separate geographical areas or islands, each handled by one mobility server. A combination is of course also possible. The number of base stations, radio exchanges and cordless terminals connected to each mobility server can of course be many more than shown. Furthermore the first mobility server could also have a direct connection to the third mobility server.

Each radio exchange RE is connected to a respective mobility server via a trunk line. The radio exchange has, despite the name, no real switching capability. It switches the calls to different base stations in channels on the trunk line. It can however not switch any calls from one cordless terminal to the other without passing the mobility server even though the cordless terminals would be connected to the same radio exchange via the same or different base stations. It also has means for signaling and means for handling mobility such as for handling authentication, location updating and security aspects. The RE also comprises means for compression and decompression of speech. The functioning of a radio exchange is disclosed in more detail in WO96/17484, where it is labeled as a central interface unit (CIU), which document is herein incorporated by reference.

Each mobility server comprises means for switching traffic or a switch core 32, 40 and 50, to which the respective radio exchange 18, 20, 22 and the network 11 are connected and a respective means for controlling said means for switching or a control means CTRL 31, 38 and 48. The control means CTRL 31, 38 and 48 are connected to the switch cores 32, 40 and 50, respectively. The second mobility server 14 comprises a table 46 or first register means for registering to which mobility server all cordless terminals in the network belong, which table is connected to the control means 38. Each mobility server 12, 14 and 16 also comprises a respective home data base HDB 34, 44 and 54 or second register means, for registering cordless terminals belonging to the mobility server and a respective visitor data base VDB 36, 42, 52 or third register means, for registering cordless terminals located in the geographical area of a mobility server. The VDBs 36, 42 and 52 and HDBs 34, 44 and 54 are connected to CTRLs 31, 38 and 48, respectively. The control means 31, 38 and 48 have many more functions than just handling of traffic, as will be described further later.

The handling of mobility in a mobility server is generally performed according to the standards ETS 300 768 and 300 769 for handling authentication, ETS 300 691 and ETS 300 692 for handling location updating and ETS 300 694 and ETS 300 695 for handling incoming and outgoing calls. These standards are basic DECT standards outlining how to handle mobility in DECT systems. The control means has most switch control functions normally associated with a private branch exchange and sets up connections, generates alarms, disconnects connections, as well as comprises different functions which may be used by a cordless terminal, such as call-back, call-forwarding, transportation of calls etc. It can also comprise such functions as message waiting and voice mail, but then it must of course either comprise or have access to a voice mail server (not shown). It also has some mobility functions such as location updating and authentication. Each mobility server has a geographical area, which as mentioned above is defined as the area within which a cordless terminal is able to uphold radio communication with the mobility server via a base station connected to that mobility server. The HDB keeps a register of all cordless terminals that belong to a mobility server. Terminals are registered as belonging to a mobility server if the user of that terminal is expected to be in the geographical area of that mobility server frequently over a longer period of time, for example because he works there. The HDB also comprises the service profile for each such cordless terminal, i.e. which services each such terminal is allowed to use, as well as which VDB each terminal is registered in if it is switched on in the network. A cordless terminal in the network may belong to one mobility server, but be temporarily located in the geographical area of another mobility server. If the cordless terminal however is in the geographical area of the mobility server where it has its HDB, it is still registered in the VDB of this mobility server and the HDB will contain some indication of this fact. The preferred embodiment of the invention is a system of the DECT type and then such a network may be provided for say an office building that makes up a so called DECT island. The VDB does keep track of all cordless terminals, both terminals visiting the geographical area of the mobility server in question, i.e. terminals belonging to the HDB of another mobility server, but temporarily being physically located in the geographical area of this mobility server or belonging to it and also keeps track of which radio exchange each terminal is in contact with.

Each cordless terminal in the present network has its own identity and calls are set up to the terminals using this identity, which therefore is used all over the network for keeping track of a terminal.

Figures 2A, 2B:
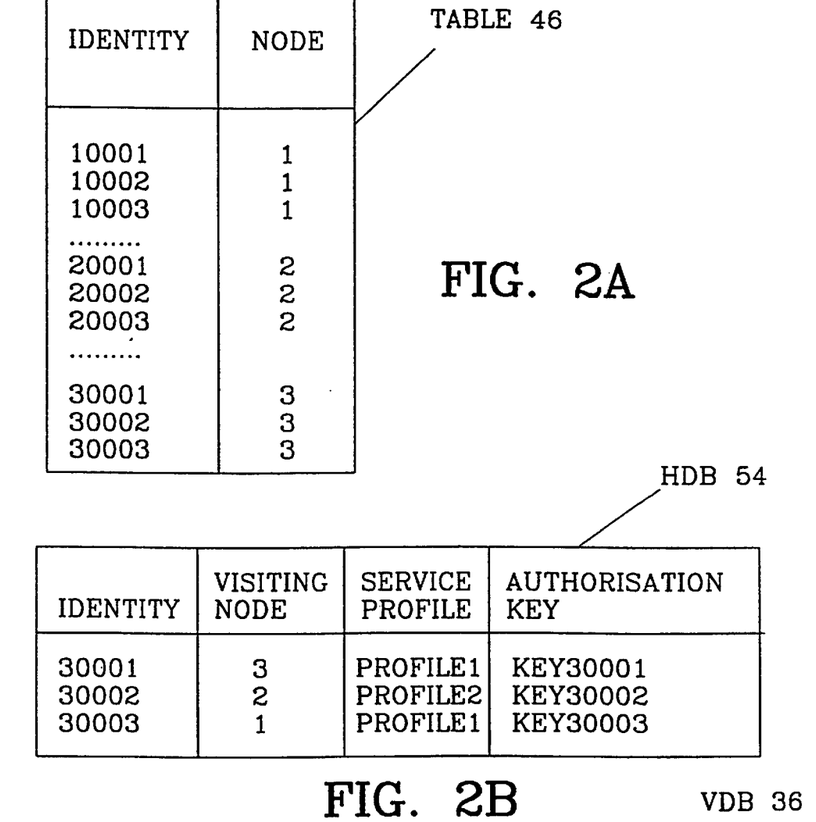
FIG. 2A shows the principal content of a first registering means or table according to the invention.
FIG. 2B shows the principal content of one home data base in the network according to the invention.

FIG. 2A shows how the table 46 in the second node might be realized with only two columns. A first column denoted IDENTITY comprises the identities of all the terminals within the whole of the network and the second column denoted NODE comprises an indication of to which node or mobility server they belong. FIG. 2A shows the identities 10001, 10002 and 10003 for three terminals belonging to node 1 or the first mobility server in FIG. 1, the identities 20001, 20002 and 20003 for three terminals belonging to node 2 and finally the identities 30001, 30002 and 30003 for three terminals belonging to node 3. The table would in reality include the identities of many more terminals belonging to each node, but only three for each node are shown for the sake of clarity. One further detail that might be mentioned here is that the identities of the cordless terminals shown in FIG. 2A have all been assigned to a node using a known system. That is all cordless terminals belonging to node 1 have an identity or a number included in a number series beginning with 10000, all cordless terminals belonging to node 2 have a number or identity in a number series beginning with 20000 and all cordless terminals belonging to node 3 have a number in a number series beginning with 30000. This way of assigning numbers is part of the state of the art and the present invention is not limited to this way of assigning the identity of a terminal to a node as will be described further below. Thus any kind of number could have had been used for terminals belonging to a particular node.

FIG. 2B shows the home data base of the third node in FIG. 3 and includes four columns, a first denoted IDENTITY where the identities of the terminals belonging to the node are entered, a second column denoted VISITING NODE which indicates which node a terminal registered in the HDB is visiting or in which VDB the information of location of the terminal might be found, a third column denoted SERVICE PROFILE which indicates the type of services each terminal is allowed to use and finally a columns denoted AUTHORIZATION KEY containing a code word to be used to authenticate a cordless terminal before it gets access to the network or service, for example when updating the location of a cordless terminal. The HDB of FIG. 2B only includes information about three terminals, terminal 30001, which visits node 3 (in reality indicating that it is not visiting at all but is really located in the area of the home node), has a first service profile PROFILE1 and an authorization key KEY30001, terminal 30002, which visits node 2, has a second service profile PROFILE2 and an authorization key KEY30002, and finally terminal 30003, which visits node 1, has the first service profile PROFILE1 and an authorization key KEY30003. The service profile indicates what types of services a terminal is allowed to use, of which a few were mentioned above. Different service profiles might be arranged by only allowing some terminals to make local telephone calls or excluding international calls. There exist a number of different services of which only a few have been mentioned above and one can set up a large amount of different service profiles. In reality the HDB can of course include information about several more terminals. The HDBs of the two other nodes have the same structure as this HDB in node 3.

Figure 2C:
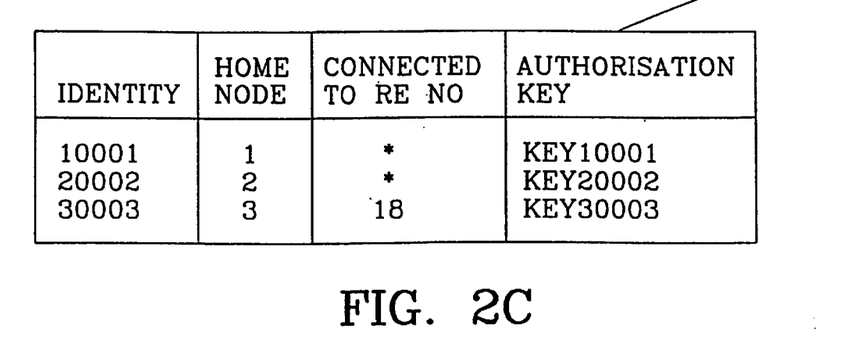
FIG. 2C shows the principal content of a visitor data base in the network according to the invention.

FIG. 2C shows the VDB of node 1 and includes information about all terminals in the geographical area of the first mobility server in FIG. 1. The VDB includes a table having four columns denoted IDENTITY, HOME NODE, CONNECTED TO RE NO and AUTHORIZATION KEY, which columns indicate the number or identity of the cordless terminals in the area of the first mobility server, which mobility server or home node they belong to, to which radio exchange, of all the radio exchanges connected to the first mobility server, that each terminal is in radio contact with and an authorization key for each terminal to be used to authenticate the terminal before giving it access to the network. For the reason of clarity the VDB only includes information about three terminals, but in reality it can of course include information about several more terminals. The table thus includes the following information about terminals visiting node 1: terminal 10001, which belongs to node 1 (in reality indicating that it is not visiting at all but is really located in the area of the home node), is connected to RE * (* here indicates that it is connected to a RE other than the first RE 18 in FIG. 1 since FIG. 1 only contains one RE connected to node 12) and has authorization key KEY10001, terminal 20002, which belongs to node 2, is connected to RE * and has authorization key KEY20002, and finally terminal 30003, which belongs to node 3, is connected to the first RE 18 in FIG. 1 and has authorization key KEY30003. The VDBS of the two other nodes have the same structure as this VDB in node 1.

Now that the structure of a private network according to a first preferred embodiment has been described the functioning of the network will be described in more detail.

The signaling between different entities will now first be generally outlined, i.e. how different entities in the private network work together in order to set up traffic connections.

Signaling between two mobility servers within the network is done according to the QSIG (ISDN signaling over Q reference point), signaling scheme and from a mobility server to the public network with DSS1 (Digital Subscriber Signaling System No. one). The signaling between CT 30, base station 24 and RE 18 is well known within the art and is described in the standard ETS 300 175. The signaling between a RE and a mobility server is done according to a signaling based on the signaling scheme DSS1 for communication between a PBX and a public network. This signaling scheme DSS1 has been modified in order to take care of mobility features. Therefore the new signaling scheme has means for handling different mobility aspects in DECT networks, like means for handling authentication according to the standard ETS 300 769, means for handling location updating according to the standard ETS 300 692 and means for handling incoming and outgoing calls according to the standard ETS 300 695.

There are basically two situations in which the table 46 according to the invention is used and that is during location updating and when an incoming call is set up to a cordless terminal in the network.

The initial setting of a terminal as belonging to the network according to the invention will now be described with reference to FIGS. 1, 2A, 2B, 2C and 3, of which the latter shows a flow chart depicting a method of initiating a terminal in the private network according to the invention.

Figure 3:
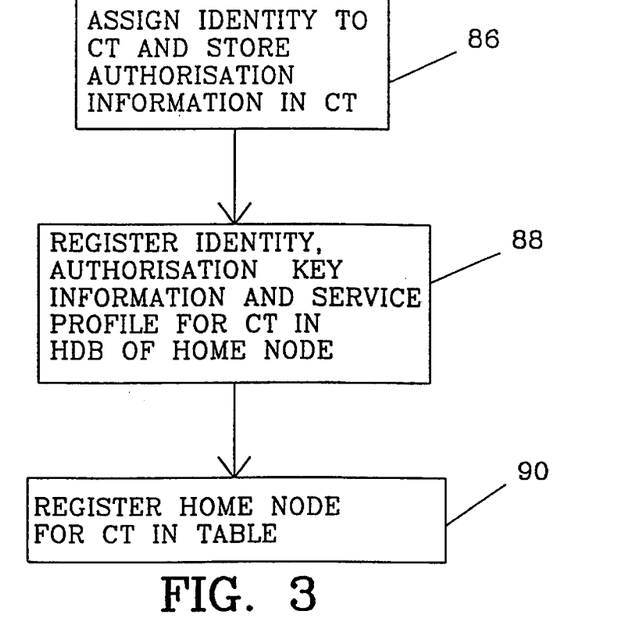
FIG. 3 shows a flow chart of a method of initiating a cordless terminal in the network according to the invention.

When initiating a cordless terminal, like for example the terminal 30 in FIG. 1 for the network according the invention, the terminal is given authorization information and assigned an identity or number, which in the example is the identity 30003, procedural step 86. The identity or the number is then registered in a HDB of a node to which it is decided that the terminal belongs. The HDB also receives an authorization key corresponding to the authorization information loaded into the terminal as well as a service profile for the terminal, procedural step 88. For the terminal 30 this means that node 3 has been selected as home node or the node to which the terminal 3 having identity 30003 belongs and therefore the HDB 54 of that node receives the service profile PROFILE1 and authorization key KEY30003. The service profile indicates what services the terminal is allowed to use. The column VISITING NODE is however not set in the HDB, this setting is not done until the terminal is switched on in the network. Thereafter the table 46 in node 2 is set. Here the home node for the terminal is registered, procedural step 90. For the terminal 30 having the number 30003, the home node is thus set as node 3. The node visited is thus not set until the terminal is turned on in the system. As a cordless terminal moves around or roams in the cordless network it seeks contact with the radio exchanges. If it contacts a radio exchange, which it does not recognize it asks for location updating. The mobility server then looks in its VDB to see if the cordless terminal is registered there and will get the authorization key from the VDB if the terminal is registered there. If it is not registered there, as is the case with a cordless terminal that has just recently been activated in the system or when the terminal has moved from the area of one mobility server to another, the mobility server has to try to find out to which node the terminal belongs. This was previously done by analyzing the identity and contacting a mobility server associated with the number interval within which the number of the identity lay. How it is done in the present case will be described below. As long as a cordless terminal moves within the geographical area of a mobility server in a node where it is registered in the VDB of that mobility server, the location is automatically updated after authentication of the terminal by using the authorization key for the terminal stored in the VDB.

Figure 4:
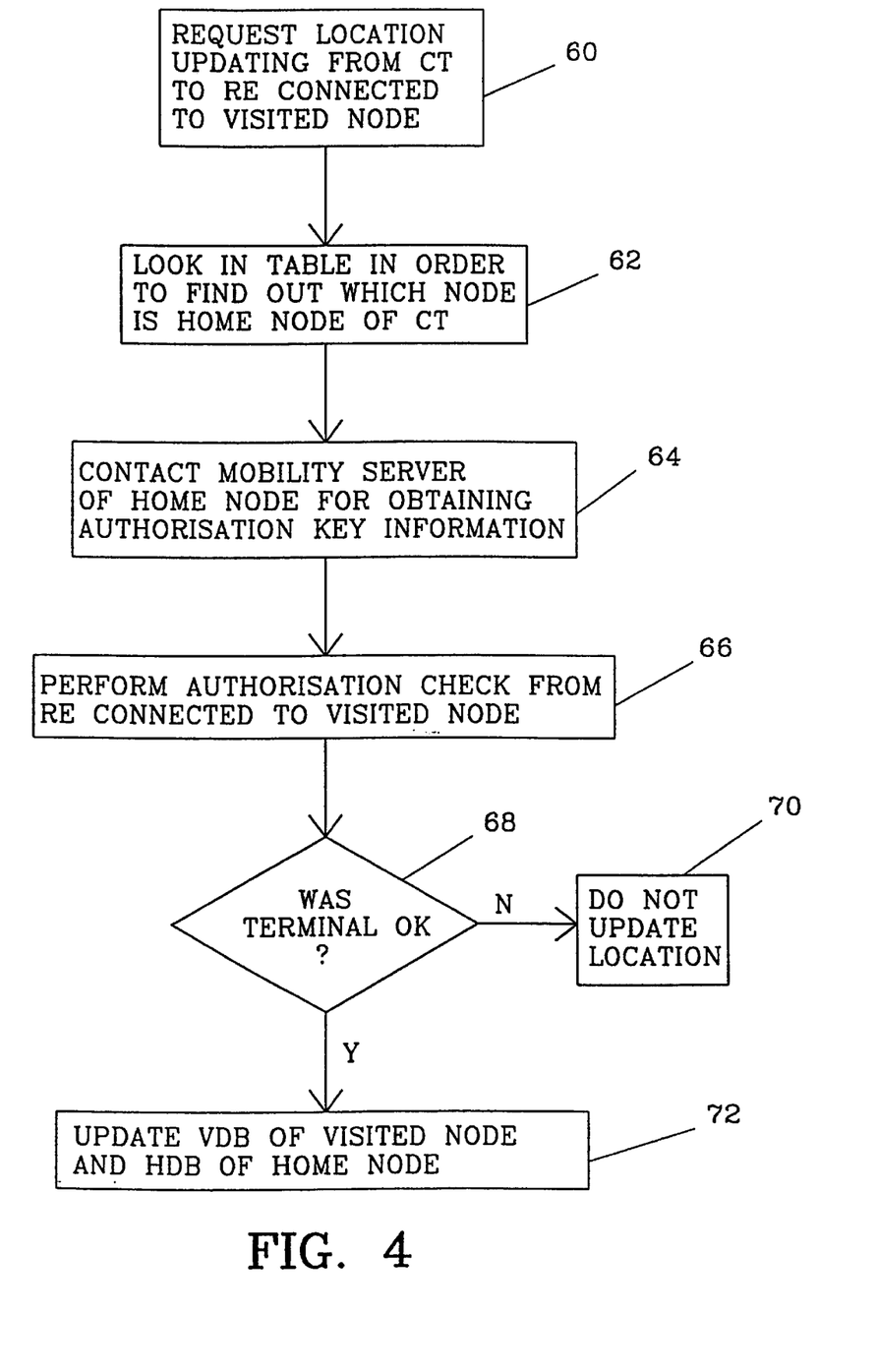
FIG. 4 shows a flow chart of a method of location updating according to the invention.

One of the aspects when the table containing information of which mobility server is home node is consulted, is the case when a cordless terminal performs location updating because it has moved from one node to the other, i.e. from the geographical area of one mobility server to the geographical area of another mobility server. One such case will now be described with reference to FIGS. 1, 2A, 2B, 2C and 4, where FIG. 4 shows a flow chart depicting a method of location updating.

Assume first that the first cordless terminal CT 30 has the identity 30003, belongs to node 3, which node is therefore also called the home node, and is initially also located there, i.e. is located in the third geographical area 6. The table 46 in node 2 would then include an indication that the terminal with identity or number 30003 belongs to node 3. The HDB 54 of node 3 would then include information about service profile and authorization key as well as which node it was visiting (which would originally be set as visiting node 3). The VDB 52 of node 3 would then also include an indication about that terminal being connected to a certain RE connected to the third mobility server 16. No other HDB and VDB would then contain information about this terminal 30.

Assume now that the terminal 30 moves to the first geographical area 2 of node 1, which node is therefore also called visited node, and more particularly to an area covered by the first base station 24 connected to the first RE 18. The CT 30 would then not recognize the base station and RE and would therefore send out a location updating request including the identity 30003 to the first RE 18, procedural step 60. The first mobility server 12 then looks into the VDB 36 in order to try to locate information about the terminal. Since this register means does not include any information about the CT 30, the first mobility server therefore contacts the second mobility server 14. The second mobility server looks in the table 46 and finds out therefrom that the terminal 30 with identity 30003 belongs to node 3, procedural step 62. This information is then returned to the first mobility server.

The first mobility server then goes on and contacts the third mobility server 16 in node 3, procedural step 64. The third mobility server looks in the HDB 54 and fetches the authorization key KEY30003 therefrom for sending to the first mobility server so that location updating can be performed. When the first mobility server 12 has received this authorization key it forwards it to the first RE 18. The RE then performs an authorization check for the terminal, procedural step 66. In this check the RE sends a so called challenge to the CT. The terminal sends an answer to this challenge, which answer is calculated base on the preprogrammed authorization information received when initially programming the terminal. The answer is compared, in the RE, with information included in the authorization key and the location is updated if the answer is correct or corresponds to the information included in the authorization key. How this type of updating is performed is something well known within the art and is furthermore described in the standard ETS 300 693. There are furthermore many different ways this authorization check can be made in. If the check gives an incorrect result, procedural step 68, the terminal is ignored, no updating performed and the terminal is therefore denied access to the network, procedural step 70. If the check gives a correct-result, procedural step 68, the RE informs the first mobility server of this fact. The first mobility server then updates the VDB with information about the terminal, so that the VDB 36 is filled with the identity 30003 of the terminal, the home node, node 3, the first RE 18 which it is connected to and the authorization key KEY30001, as can be seen in the line at the bottom of FIG. 2C. The first mobility server then informs the third mobility server that location updating has been performed and the third mobility server updates the HDB so that the column visiting node is set to node 1 for the terminal 30, as can be seen in the line at the bottom of the HDB in FIG. 2B. The VDB of the visited node and the HDB of the home node are thus updated, procedural step 72. The third mobility server then goes on to inform the VDB of the node where the terminal was previously located about the fact that the terminal has moved and the mobility server of that location updates its VDB accordingly by deleting information concerning the CT. Since this was the VDB 52 of the home node all this later updating is performed within the third mobility server.

When a terminal is turned off, the terminal informs the mobility server to which it is connect about this fact, which mobility server of this visited node then deletes the entries about the terminal from the VDB. Said mobility server also informs the mobility server of the home node, which deletes the entry concerning visited node in the HDB, so that that the column VISITING NODE in the HDB contains no information for that terminal. No such deletion is performed if a CT suddenly loses contact with a mobility server.

The preferred method outlined above can be varied in many ways. The authorization key was, in the preferred embodiment, stored in the VDB. In this way the visited node need not contact the home node to get authorization key every time the terminal moves along among the radio exchanges of the visited node. The VDB could equally as well be provided without this information about the authorization key. In that case the mobility server in the visited node would have to get in contact with the mobility server of the home node every time location updating is performed within the visited node. This would be no problem if the mobility server of the visited node only was connected to one RE. If there are many REs connected to the visited node there would in contrast be a lot of communication between the two nodes. The authorization check need also not be performed in the RE, but can just as well be performed in the mobility server. The authorization process might also take place in a completely different region of the system. There might for instance be a central place in the network, for example in the second mobility server in FIG. 1 or in a central authorization server to which all mobility servers have access, for example via a computer network, where all authorization checks for all CTs of the network was performed. In that case questions would be distributed out to radio exchanges and/or mobility servers and the answers collected therefrom for checking at this central location. The reason for doing this centrally might be in order to achieve higher security in that the highly secret authorization keys are not sent all over the network.

Outlined above was the method followed in the case of location updating. This method is followed both in case a terminal is turned on in the system and in case a terminal moves from one geographical area to another. Now will follow an example of another case when the table 46 is consulted. Namely the case when there exists an incoming call. This case will in the following be explained with reference to FIGS. 1, 2A, 2B, 2C and 5, which later figure shows a flow chart of a method of setting up a call to a cordless terminal in the network.

Assuming first that the CT 30 now is located in the area of the first mobility server 12 and that an incoming call is made from the fixed terminal 55 connected to the public network 11, which is a second terminal. In this preferred embodiment of the invention all incoming calls are received by the second mobility server and the other mobility servers can only contact the public network directly for outgoing calls.

Figure 5:
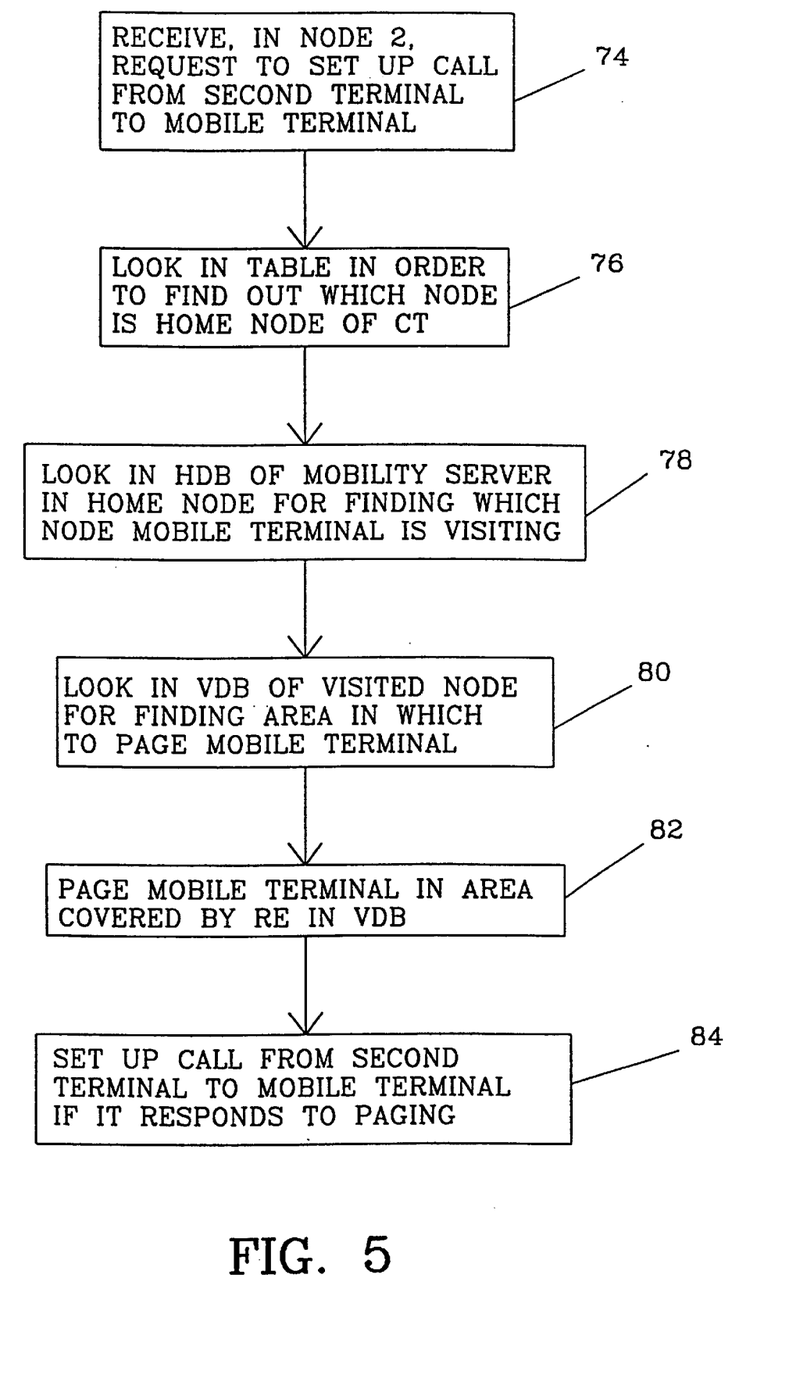
FIG. 5 shows a flow chart of a method of setting up a call to a terminal in the network according to the invention.

What happens first is that the second mobility server then receives a request for set up of a call from the second terminal 55 to the CT 30, procedural step 74. This request is sent using the identity 30003 of the terminal. The second mobility server 14 then looks in the table 46 and finds out, in the bottom of that table, that the terminal belongs to the third mobility server 16, procedural step 76. The second mobility server then sets up a traffic path from the fixed terminal 55 to itself and turns the control over to the third mobility server 16. The third mobility server therefore looks in the HDB 54 and finds, at the bottom row, that the terminal is visiting node 1, procedural step 78. The third mobility server 16 then sends a request to the first mobility server 12 for paging the cordless terminal 30, if the service profile admits such a thing and in dependence of which services, if any, the cordless terminal has activated. The first mobility server 12 then looks in the VDB 36 and finds out that the terminal 30 is in contact with the first radio exchange 18, procedural step 80. The first mobility server then orders the first radio exchange to page the terminal, procedural step 82. When performing this paging the first radio exchange 18 makes each BS 24 connected to it to send a paging signal on a paging channel via the aerial interface. When the CT 18 receives this paging signal it responds by answering one of the base stations, for example the one sending with the highest signal/noise ratio. Thereafter the first mobility server sets up one part of the traffic connection from itself to the CT 30 via the first RE and the first BS and the third mobility server sets up another part of the traffic connection between the first mobility server and the second mobility server via the third mobility server. The last part to the fixed terminal 55 has, as described above, already been set up, procedural step 84.

The traffic connection is in the preferred method above set up from the second mobility server to the third mobility server and from the third mobility server to the first mobility server. In this way all incoming traffic is passing through the home node, because all services are handled in this node. A request for services from a terminal in a visited node is then forwarded to the home node which handles the service, like for example call-forwarding. This function could as an alternative be distributed in that all or some services are handled in the visited node.

The traffic connection could also as an alternative be set up directly from node 2 to node 1. In this alternative embodiment the second mobility server would not hand over control to the third mobility server, but instead keep control and ask for the information needed for setting up a call, i.e. what node the terminal is visiting and then let node 1 request paging if that was allowed.

As is clear from FIG. 1, node 1 and node 3 do not have a direct connection between each other. When this is the case the signaling and connections set up between these two nodes all pass by node 2. Node 1 and node 3 could of course as an alternative have a direct connection between each other.

The incoming call was in the preferred embodiment outlined above made using the number or identity of the cordless terminal with which contact was wanted. The paging was there performed using that number. In an alternative embodiment of the invention this paging could have been performed using a special paging number selected for this occasion. This special paging number could then have been selected either in the home node or in the visited node, because each mobility server would have a range of special paging numbers to be used for paging. If the special paging number was selected in the home node, this number would of course be transmitted to the visited node together with the request for paging.

In the preferred embodiment described above all incoming calls were received in the second mobility server. Calls can alternatively be received in any mobility server or by the mobility server which is home node.

When making outgoing calls in the preferred network above a cordless terminal contacts the mobility server in the node it visits, which in turn contacts and hands over control to the mobility server of the home node. The call is then set up from the home node if the service profile allows it. In this way virtually all outgoing calls are handled by the home node. The only exception to this is that emergency calls, like for example the number 112 in Sweden or 911 in the USA, are allowed to be made from the visited node. The reason for this is that it is of course better to get hold of for example the local fire department in case of a fire when the two nodes are spaced far apart. As an alternative calls might be allowed to be set up from the visited node and some or all of the service profile be stored in the VDB of the visited node, so that the mobility server there might be allowed to perform some or all of the services the terminal is allowed to use.

The different operations described above performed in the different mobility servers are carried out in the control means 31, 38, 48, which therefore have means for performing all these tasks. These means are provided in the form of processors provided with associated memories. One can also envisage the use of a separate means for handling all these function, and then also in the form of processors provided with memories.

There are several more modifications that can be done in the invention. The VDB can contain more information transferred from an HDB such as service profile. This information could then be moved to the VDB upon location updating. In this way the mobility server of a visited node need not contact the home node every time a call is to be made. A VDB and HDB need not be part of a mobility server but can also be a data base to which the mobility server has access.

Figure 6:
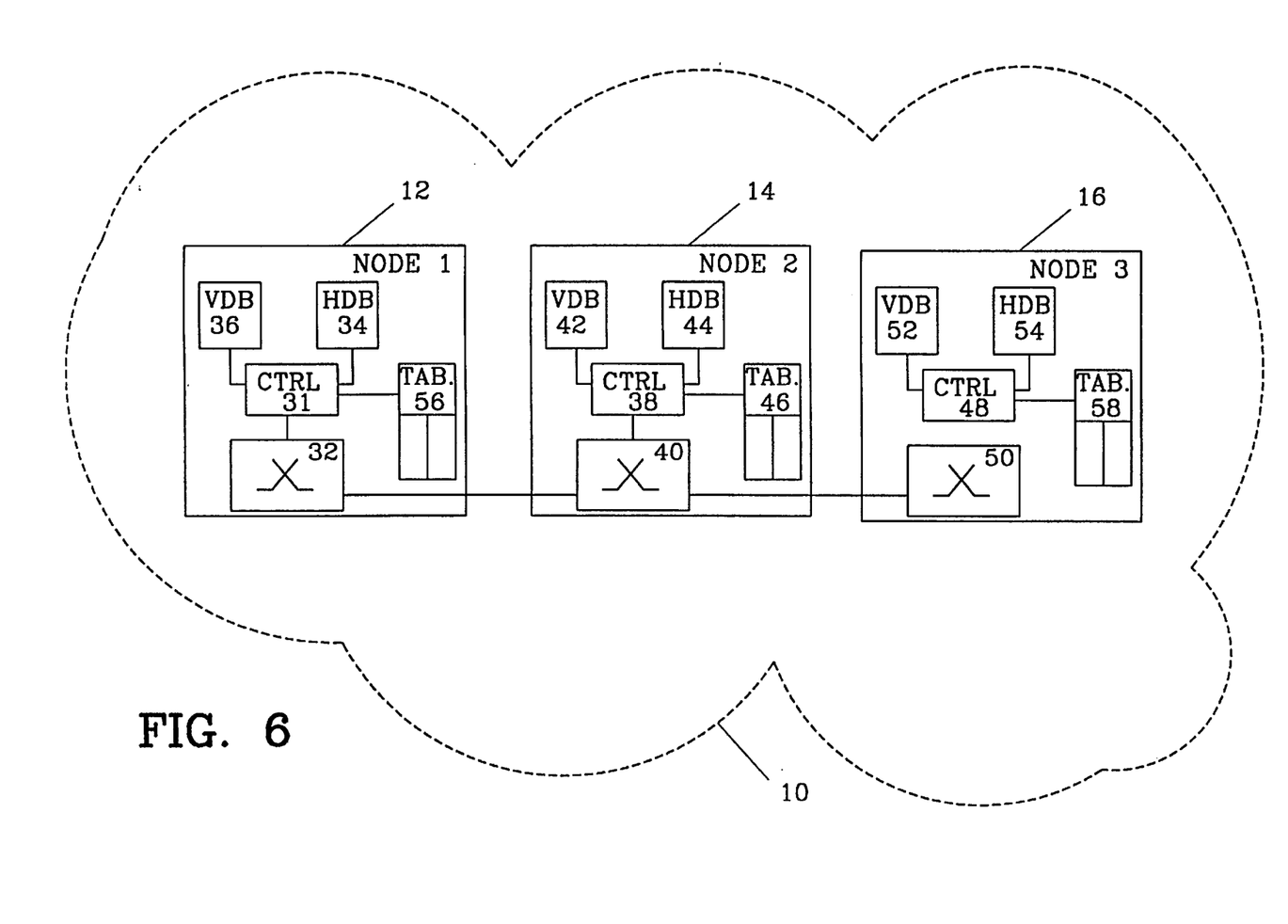
FIG. 6 shows a block schematic of a network according to a second embodiment of the invention.

FIG. 6 shows a second, alternative embodiment of the private telecommunication network according to the invention, in which all REs and base stations have been left out for the sake of clarity. No public network or a fixed terminal is shown either, but the private network 10 can of course be connected to such a public network. Furthermore the same reference numerals-are used to indicate similar means.

The only difference between the two private networks is that here also the first 12 and the third 16 mobility server have received a respective table 56 and 58 in the same way as the second mobility server. The tables are here identical and thus a mobility server does not have to contact another mobility server in order to obtain information, which thus lessens the amount of signaling performed. It is also easier for each mobility server to be able to receive incoming calls directly from the public network. The disadvantage with this embodiment is that it requires a function for updating such tables simultaneously.

Figure 7:
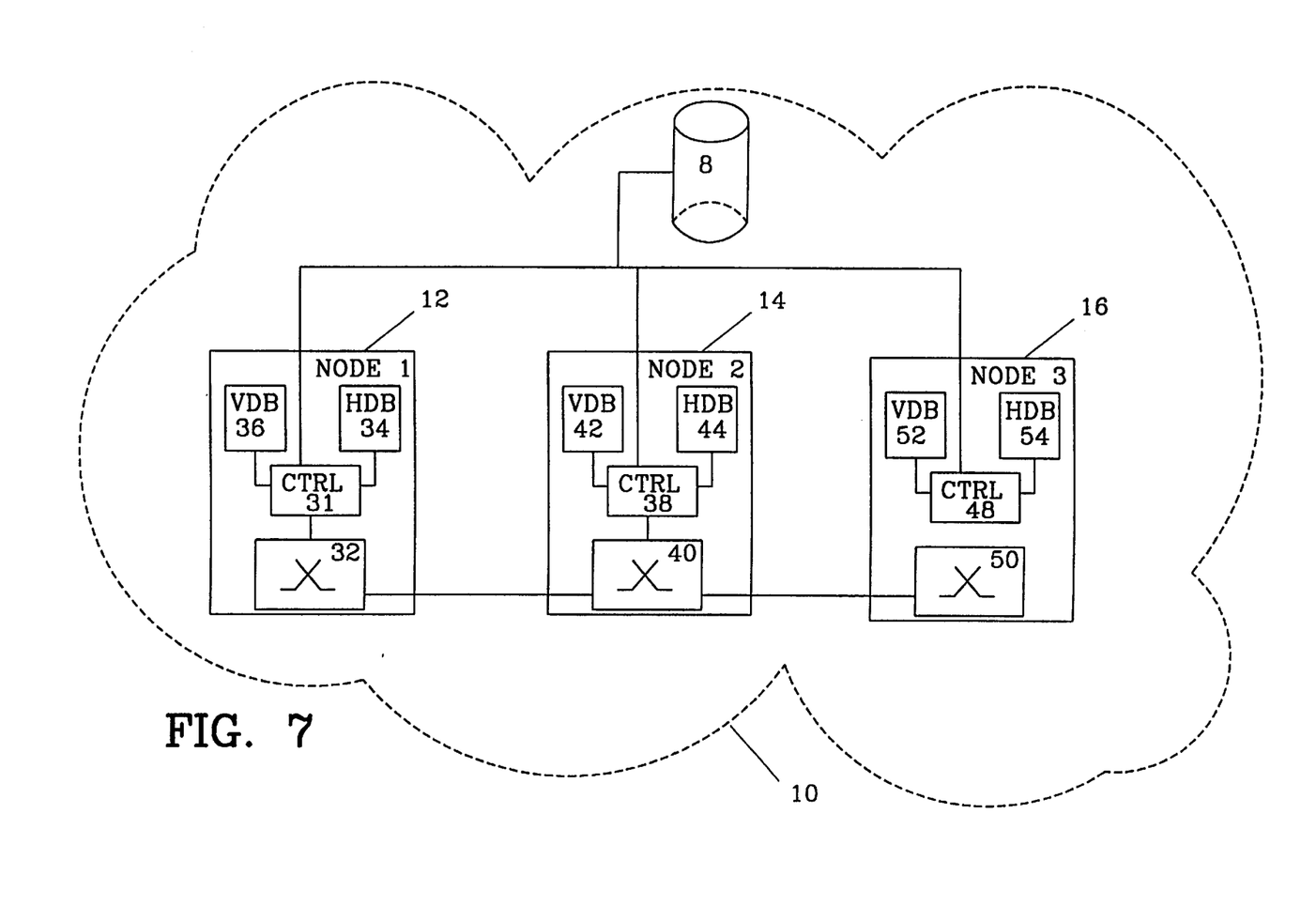
FIG. 7 shows a block schematic of a network according to a third embodiment of the invention.

A further variation is shown in FIG. 7. This figure shows a network according to a third, alternative embodiment and differs from FIG. 6 in that no mobility server is provided with a table. Each control means 31, 38 and 48 is instead connected to a server 8, which connection could be provided in the form of a computer network. The mobility servers 12, 14 and 16 would here access the server 8, which would be provided with the table containing information about where a terminal has its home node and suitable means for storing and retrieving information.

The table, HDB and VDB shown in FIGS. 2A, 2B and 2C only show a short address to each node. In reality the address for a node can be very long and therefore take up much space. In order to lessen the size of the table, VDBs and HDBs, these will then only contain a pointer to an address look-up table. Each entry in a column denoted NODE, HOME NODE or VISITED NODE would then represent a pointer to a special address position in the address look-up table where the real address for the node is to be found, which address is then used to contact the respective nodes.

What has been described above is the loosening of the bond between the identity of the terminal and the node to which it belongs, which greatly simplifies the way the home node of a cordless terminal can be changed. It also simplifies the selection of identity for cordless terminals in a cordless network in that one does not have to choose the number within a certain limited interval, but can use all numbers allocated. The loosening of above mentioned bond does, as stated above, simplify the way a change of home node can be performed in the network according to the invention. How this can be done will in the following be described with reference to FIGS. 1 and 8, which latter figure shows a flow chart of the method of updating the home node of a CT according to the invention.

The control means 31, 38 and 48 of each mobility server or node has functions or comprises means for performing above mentioned updating. Each such control means is then arranged to perform the updating for CTs registered in the VDB of the respective node. If thus for example the terminal 30 would change home node from node 3 to node 1, the updating would be controlled by the control-means 48 of node 3.

Figure 8:
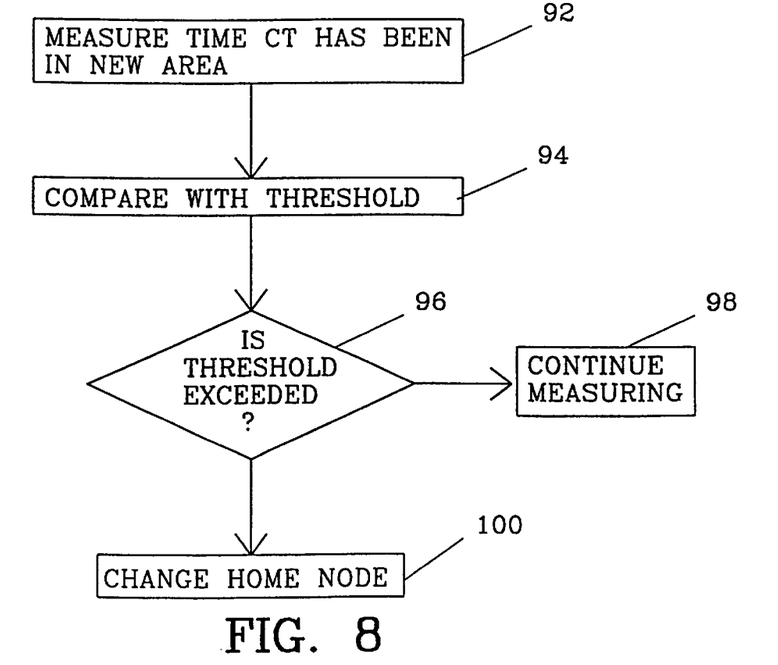
FIG. 8 shows a flow chart of a method for automatically updating the home node for a terminal in the network.

The updating is performed in the following way taking the CT 30 as an example. The third mobility server 16, which is present or old home node, measures the time the CT 30 has been in the area of the first mobility server 12, procedural step 92. It thereafter compares this time with a threshold, procedural step 94. In order to do this the home node, or some means to which the mobility server of this home node has access, stores information about how long each terminal has been visiting other nodes under the given period of time. The time is here a time that has been measured in a total time interval of say 1 month. The threshold is here set to be a percentage of the time the terminal has been switched on in the network during this interval of 1 month. The third mobility server 16 therefore measures this time that the CT 30 has been in the area of the first mobility server 12 and compares it with this threshold set as a percentage of the time the terminal has been switched on in the network. If this measurement exceeds the threshold, procedural step 96, the home node is changed for the CT 30 from node 3 to node 1, procedural step 100. If the threshold was not exceeded, procedural step 96, no updating of home node is performed and the third mobility server continues measuring, procedural step 98. The time interval within which the measurements take place is preferably quite a long time such as at least one month and the percentage of the time registered in an area is in the interval of 50–90% of the total time registered in any area and preferably about 70%. If thus a cordless terminal is in the area of the first mobility server 12 over 70% of the time, the first node will automatically be changed to be new home node. The threshold can be varied in many ways for obtaining secure registration. The interval within which measurement is made has to be chosen in such a way that the time is long enough to secure a stable pattern of nodes visited but short enough not to delay registration too long. The percentage has to be chosen in such a way that a substantial change of location triggers a change of home node while visits to other nodes are still allowed.

The measurement is easily performed by the third mobility server, since the HDB 54 includes all information about visited node and the entry in the column VISITING NODE is deleted when a terminal leaves that node. It is thus very easy for the control means 48 to keep a separate clock for every node that can be visited and running such a clock when the terminal is registered in the HDB as located in the node associated with that clock.

With the method outlined above the home node of a CT is automatically changed if the CT is more or less permanently located in a visited node. In this way a lot of unnecessary signaling between the old home node and the new home node is avoided so that the capacity of the network can be used more efficiently for what it is intended for, i.e. transporting traffic. Cumbersome manual reregistration of home node is also avoided.

It is clear that above mentioned method does not have to be performed in the old home node. It can also be performed in the new home node or in node 2 containing the table. It can also be performed in a separate server such as the server shown in FIG. 7 or if every mobility server has access to an external VDB to a means for handling that VDB. The case can also be that the old home node performs measurements and makes the decision to change home node and this server or management node performs the actual change. It is however preferred to do the measurement and make the decision to change home node in the old home node, since it contains all necessary information about the terminal and all the other solutions would require a lot of signaling. If the HDB is a separate entity to which a mobility server has access it would of course also be possible to let said separate entity make the measurement and perform the updating. As an alternative a counter is provided for each node and a counter for a certain node is incremented each time a cordless terminal is used from that node. The change of home node is then actuated if the value of one such counter exceeds a threshold value. Another possible variation is that one can take the time the terminal has been switched off into account when deciding upon change of home node. This could be done through registering the actual time a terminal has been registered as visiting a node during the time interval and comparing this actual time with the actual times registered as being in other nodes and comparing these actual times with each other. Another possible way of varying the decision making process is by weighting the percentages differently. This might be of interest if one of the nodes is small in that it cannot handle too much traffic in order to avoid that this particular node gets assigned more terminals than it can handle. The threshold mentioned above need also not take account of the time the terminal is turned on in the network, but might be set as a percentage of the time of the whole measurement interval.

Figure 9:
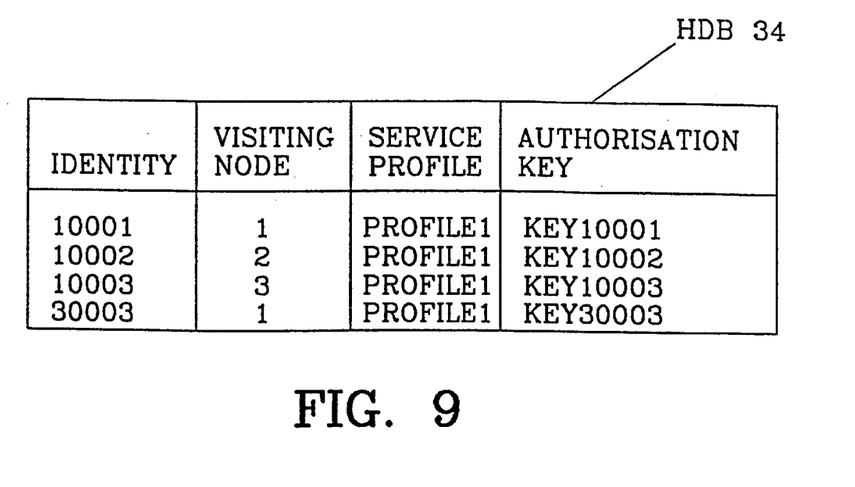
FIG. 9 shows the principal content of another home data base in the network according to the invention and FIG. 10 shows a flow chart of a method for actual changing of the home node of a terminal in the method of FIG. 8.
Figure 10:
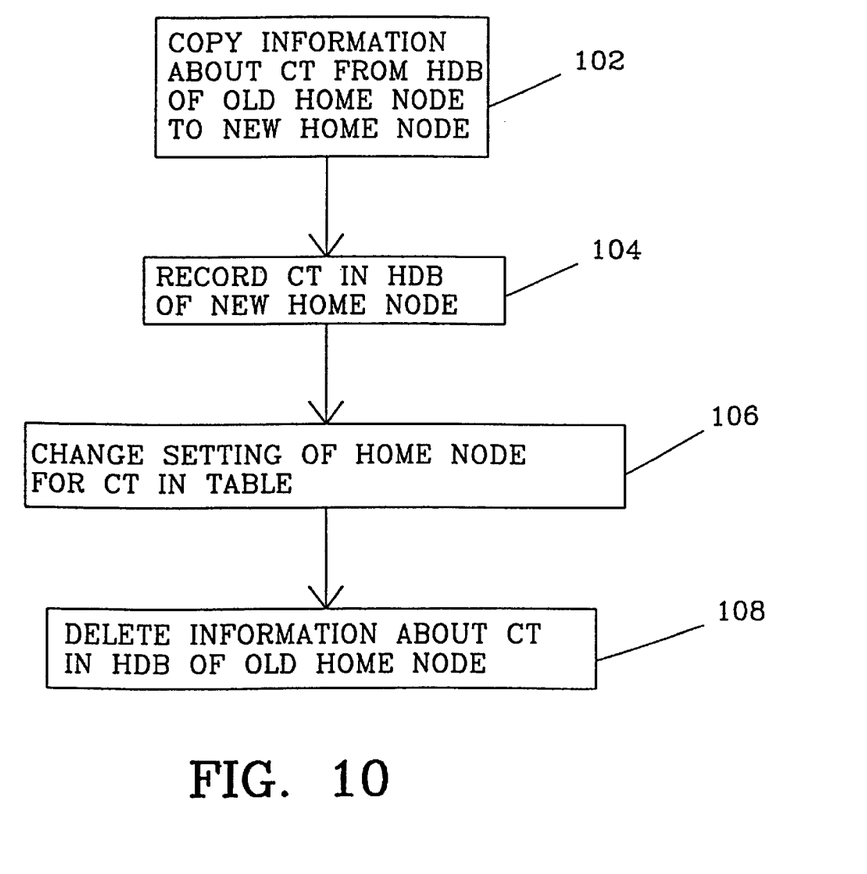

How the actual updating is performed after such a measurement will now be described with reference to FIGS. 1, 2A, 9 and 10, where FIG. 9 shows the content of the HDB of node 1, the new home node, and FIG. 10 shows a flow chart of the method for the actual changing of the home node in the network in FIG. 1.

FIG. 9 shows the HDB 34 of node 1 and this HDB is similar to the HDB of node 3 shown in FIG. 2B. The main difference, apart from the obvious registering of other CTs, i.e. CTs belonging to node 1 instead of CTs belonging to node 3, is that this table also includes the terminal having the identity 30003 and previously mentioned as belonging to node 3. The HDB contains information about CTs having node 1 as home node and all the CTs have the service profile PROFILE1. A first CT has the identity 10001, is located in node 1 and has the authorization key KEY10001. A second CT with identity 10002 is visiting node 2 and has authorization key KEY10002. A third CT with identity 10003 is visiting node 3 and has authorization key 10003. Finally the CT 30 with identity 30003 is registered as visiting node 1 and has authorization key KEY30003.

When the control means 48 of node 3 has decided to change home node according to the method described in relation to FIG. 8, it copies the information about the CT 30 from the HDB 54 in node 3, the old home node, to the node 1, the new home node, procedural step 102. The control means 31 of node 1, which receives this information then records the CT in the HDB 34 of node 1, i.e. it enters the received information into this HDB, procedural step 104. Thereafter the control means 31 of node 1 informs the control means 48 of node 3 that entry has been made in the HDB 34. The control means 48 of node 3 then informs the control means 38 of node 2 that an updating of the table has to be performed. The control means 38 of node 2 then updates the table through changing the setting of home node for CT 30 from node 3 to node 1, procedural step 106. In this way node 1 has now been set as new home node. For all new traffic connections to be set up, the new home node is the one controlling all services. The old home node is however still acting as home node for any traffic connections that are going on during this change. Node 2 now informs node 3 that the table has been updated. Now only one step in the method is left. The third mobility server therefore deletes the information about the CT 30 in the HDB 54, procedural step 108. This deletion does not have to be made immediately. It is on the contrary very important that the information is not deleted while any ongoing traffic connections are handled, which were set up while node 3 was still home node.

With the method described above it is possible to have one ongoing traffic connection to the CT, where the services to be used for that connection is handled by the old home node, simultaneously with other activity handled by the new home node. Such other activity could be information about a message waiting in a mail box of the user or the transmittal of an SMS (Short Message Service) message or the informing a calling party that the terminal is busy.

The method described above can of course also include updating of a VDB containing information about the terminal, so that the VDB gets updated to include the address or a pointer to the new home node. This step is preferably performed as soon as possible after the table has been updated, i.e. before the deletion of information about the terminal in the HDB of the old home node. In this case the third mobility server immediately orders node 1, the node where the terminal is located at the moment, to update the VDB when it receives information from node 2 that the table 46 has been updated.

The reason for performing the method in above mentioned way is that there might be a lot of information to transfer between two nodes when changing home node. It is furthermore not desirable to transfer this information when there is a lot of traffic in the network. Therefore the updating is preferably performed at night. At the same time one does want the actual change of home node to be almost instantaneous so that it will not affect a user of the network if the change is taking place when an HDB needs to be accessed. This can be done very rapidly by the above outlined method.

With the method of updating the home node described above, a method is obtained that automatically updates the home node of a terminal. No change of identity of the terminal is needed and therefore the terminal can be continued to be used while a change of home node takes place. The method also ensures secure automatic updating of home node through setting the threshold appropriately.

Of course updating does not have to be automatic, but can also be performed manually, i.e. upon request from a user of a terminal and then the table, HDB and VDB is changed by service personnel.

The network according to the invention can be further modified in that the radio exchanges can be left out altogether and the base stations are directly connected to a mobility server. In this case a mobility server would include the mobility handling functions contained in the RE. Then each base station would either be connected to the mobility server via an own telecommunication line or a number of base stations would be connected to the mobility server via some multiplexing/demultiplexing means. In case no radio exchange would be used, all the mobility handling functions would be incorporated into the mobility server. The mobility server would then, because of the nature of the DECT system, also contain compressing/decompressing means and would then avoid decompression of speech signals intended for another CT connected to the same mobility server or such signals intended for another mobility server in the same network. This would avoid unnecessary compression and decompression that would otherwise be performed in the system.

The invention has been described in relation to mobility servers having a switching function. It can of course just as well be used together with a mobility server lacking such a function. It is furthermore not limited to the use in a network comprising only cordless terminals. Also networks comprising both cordless and fixed terminals can use the invention. It is neither limited to mobility servers, but it can be used in any private telecommunication network where one has to handle mobility.

The invention is of course not limited to the embodiments described above and shown in the drawings, but can be modified within the scope of the enclosed claims.

What is claimed is:

1. A method of updating to which means for handling cordless terminals a cordless terminal belongs in a private telecommunication network, where a geographical area within which a cordless terminal is able to uphold radio contact with a means for handling cordless terminals, via a base station connected to that means for handling cordless terminals, is defined as the geographical area of that means for handling cordless terminals, and wherein each cordless terminal belongs to one means for handling cordless terminals, said method comprising the steps of:

determining a measure of the time the cordless terminal has been located in a geographical area of a new means for handling cordless terminals other than an old means for handling cordless terminals to which the terminal belongs, wherein the new means for handling cordless terminals measures the time the cordless terminal has been located in the geographical area of the new means for handling cordless terminals; and setting the cordless terminal as belonging to the new means for handling cordless terminals if the measure exceeds a threshold.

2. The method of claim 1, wherein the measure is the actual time the cordless terminal is registered as being located in the geographical area of the new means for handling cordless terminals and the method further comprises the step of:

comparing the time with the threshold, where the threshold is set as a percentage of the time the cordless terminal has been switched on in the network during a measurement interval.

3. The method of claim 1, wherein the measure is the actual time the cordless terminal is registered as being located in the geographical area of the new means for handling cordless terminals and the method further comprises the step of:

comparing the time with a threshold, where the threshold is set as a percentage of a measurement interval.

4. The method of claim 1, wherein the threshold used for one means for handling cordless terminals is weighted in relation to thresholds used for other means for handling cordless terminals in the network.

5. The method of claim 1, wherein the step of setting further comprises the steps of:

recording the terminal as belonging to the new means for handling cordless terminals in a second register means, wherein the second register means is associated with the new means for handling cordless terminals and keeps track of all cordless terminals belonging to the new means for handling cordless terminals;

changing a setting of the terminal from being set as belonging to the old means for handling cordless terminals to being set as belonging to the new means for handling cordless terminals in at least one first register means, wherein the at least one first register means keeps track of to which means for handling cordless terminals all cordless terminals in the network belong; and deleting a registration of the terminal as belonging to the old means for handling cordless terminals in a second register means associated with the old means for handling cordless terminals.

6. The method of claim 5, wherein the step of setting further comprises the step of:

recording the terminal as belonging to the new means for handling cordless terminals in a third register means, wherein cordless terminals associated with the geographical area in which the cordless terminal is presently located are registered in the third register means.

7. The method of claim 5, wherein the step of recording is preceded by the step of:

copying information concerning said terminal from the second register means associated with the old means for handling cordless terminals to the second register means associated with the new means for handling cordless terminals.

8. A telecommunication network comprising:

at least two means for handling cordless terminals, each such means being connected to at least one respective base station for communication with at least one cordless terminal in order to handle connections set up to and from as well as to handle functions available to said cordless terminal, where a geographical area within which a cordless terminal is able to uphold radio contact with a means for handling cordless terminals via a base station connected to that means for handling cordless terminals is defined as the geographical area of that means for handling cordless terminals and each cordless terminal belongs to one means for handling cordless terminals;

means for determining a measure of the time a cordless terminal has been located in a geographical area of a new means for handling cordless terminals other than an old means for handling cordless terminals to which said terminal belongs, wherein the new means for handling cordless terminals includes the means for determining a measure of time; and means for setting the cordless terminal as belonging to the new means for handling cordless terminals if the measure exceeds a threshold.

9. The network of claim 8, wherein the measure is the actual time the cordless terminal is registered as being located in the geographical area of the new means for handling cordless terminals and the means for determining a measure comprises means for comparing the time with the threshold, where the threshold is set as a percentage of the time the cordless terminal has been switched on in the network during a measurement interval.

10. The network of claim 8, wherein the measure is the actual time the cordless terminal is registered as being located in the geographical area of the new means for handling cordless terminals and the means for determining a measure comprises means for comparing the time with the threshold, where the, threshold is set as a percentage of a measurement interval.

11. The network of claim 9, wherein the means for setting further comprises;

means for first recording of the terminal as belonging to the new means for handling cordless terminals, which means for first recording is arranged for connection to a second register means associated with the new means for handling cordless terminals and comprising information about all terminals belonging to the new means for handling cordless terminals;

means for changing a setting of the terminal from being set as belonging to the old means for handling cordless terminals to being set as belonging to the new means for handling cordless terminals, which means for setting is arranged for connection to at least one first register means keeping track of to which means for handling cordless terminals all cordless terminals in the network belong; and means for deleting a registration of the terminal as belonging to the old means for handling cordless terminals, which means for deleting is arranged for connection to a second register means associated with the old means for handling cordless terminals, in order to change registration of the cordless terminal.

12. The network of claim 11, wherein the means for setting comprises means for second recording of the terminal as belonging to the new means for handling cordless terminals, which means for second recording is arranged for connection to a third register means containing information about cordless terminals located in the geographical area of a means for handling cordless terminals in whose geographical area the cordless terminal is currently located, in order to set the terminal as belonging to the new means for handling cordless terminals in the third register means.

13. The network of claim 11, wherein the means for first recording comprises means for copying information concerning the terminal from the second register means associated with the old means for handling cordless terminals to the second register means associated with the new means for handling cordless terminals.

14. A means for handling cordless terminals arranged for connection in a private telecommunication network that comprises at least said means for handling cordless terminals and another means for handling cordless terminals, where each such means is arranged for connection to at least one respective base station for communication with at least one cordless terminal in order to handle connections set up to and from as well as to handle functions available to said cordless terminal;

where a geographical area, within which a cordless terminal is able to uphold radio contact with a means for handling cordless terminals via a base station connected to that means for handling cordless terminals, is defined as the geographical area of that means for handling cordless terminals and each cordless terminal belongs to one means for handling cordless terminals, wherein the means for handling cordless terminals comprises means for determining a measure of the time a cordless terminal has been located in a geographical area of a new means for handling cordless terminals other than an old means for handling cordless terminals to which said terminal belongs, wherein the new means for handling cordless terminals includes the means for determining a measure of time; and means for setting the cordless terminal as belonging to the new means for handling cordless terminals if the measure exceeds a threshold.

15. A server for connection in a private telecommunication network comprising at least two means for handling cordless terminals, each such means being connected to at least one respective base station for communication with at least one cordless terminal in order to handle connections set up to and from as well as to handle functions available to said cordless terminal, where a geographical area, within which a cordless terminal is able to uphold radio contact with a means for handling cordless terminals via a base station connected to that means for handling cordless terminals, is defined as the geographical area of that means for handling cordless terminals and each cordless terminal belongs to one means for handling cordless terminals; said server comprising:

means for determining a measure of the time a cordless terminal has been located in a geographical area of a new means for handling cordless terminals other than the old means for handling cordless terminals to which said terminal belongs, wherein the new means for handling cordless terminals includes the means for determining a measure of time; and means for setting the cordless terminal as belonging to the new means for handling cordless terminals if the measure exceeds a threshold.

16. A method of updating to which means for handling cordless terminals a cordless terminal belongs in a private telecommunication network, where a geographical area within which a cordless terminal is able to uphold radio contact with a means for handling cordless terminals via a base station connected to that means for handling cordless terminals is defined as the geographical area of that means for handling cordless terminals and each cordless terminal belongs to one means for handling cordless terminals, said method comprising the steps of:

determining a measure of the time the cordless terminal has been located in a geographical area of a new means for handling cordless terminals other than an old means for handling cordless terminals to which the terminal belongs; and setting the cordless terminal as belonging to the new means for handling cordless terminals if the measure exceeds a threshold.

17. A telecommunication network comprising:

at least two means for handling cordless terminals, each such means being connected to at least one respective base station for communication with at least one cordless terminal in order to handle connections set up to and from as well as to handle functions available to said cordless terminal, wherein a geographical area, within which a cordless terminal is able to uphold radio contact with a means for handling cordless terminals via a base station connected to that means for handling cordless terminals, is defined as the geographical area of that means for handling cordless terminals and each cordless terminal belongs to one means for handling cordless terminals;

means for determining a measure of the time a cordless terminal has been located in a geographical area of a new means for handling cordless terminals other than an old means for handling cordless terminals to which said terminal belongs; and means for setting the cordless terminal as belonging to the new means for handling cordless terminals if the measure exceeds a threshold.

18. A means for handling cordless terminals arranged for connection in a private telecommunication network that comprises at least said means for handling cordless terminals and another means for handling cordless terminals, where each such means is arranged for connection to at least one respective base station for communication with at least one cordless terminal in order to handle connections set up to and from as well as to handle functions available to said cordless terminal, where a geographical area, within which a cordless terminal is able to uphold radio contact with a means for handling cordless terminals via a base station connected to that means for handling cordless terminals, is defined as the geographical area of that means for handling cordless terminals and each cordless terminal belongs to one means for handling cordless terminals, wherein the means for handling cordless terminals comprises: means for determining a measure of the time a cordless terminal has been located in a geographical area of a new means for handling cordless terminals other than an old means for handling cordless terminals to which said terminal belongs; and means for setting the cordless terminal as belonging to the new means for handling cordless terminals if the measure exceeds a threshold.

19. A server for connection in a private telecommunication network comprising at least two means for handling cordless terminals, each such means being connected to at least one respective base station for communication with at least one cordless terminal in order to handle connections set up to and from as well as to handle functions available to said cordless terminal, where a geographical area, within which a cordless terminal is able to uphold radio contact with a means for handling cordless terminals via a base station connected to that means for handling cordless terminals, is defined as the geographical area of that means for handling cordless terminals and each cordless terminal belongs to one means for handling cordless terminals; said server comprising:

means for determining a measure of the time a cordless terminal has been located in a geographical area of a new means for handling cordless terminal belongs; and means forgetting the cordless terminal as belonging to the new means for handling cordless terminals if the measure exceeds a threshold.

20. In a network including a first and second mobility server, each mobility server including a home data base and a visitor data base, a method for registering a cordless terminal comprising the steps of:

registering the cordless terminal in the home data base of the first mobility server;

registering the cordless terminal in the visitor data base of the second mobility server;

determining an amount of time that the cordless terminal has been located in a geographical area associated with the second mobility server; and registering the cordless terminal in the home data base of the second mobility server if the amount of time exceeds a threshold.

* * * * *